(12) United States Patent
Ko et al.

(10) Patent No.: US 8,585,172 B2
(45) Date of Patent: Nov. 19, 2013

(54) INK DISCHARGE APPARATUS AND METHOD OF CONTROLLING THE SAME

(75) Inventors: Kang Woong Ko, Seoul (KR); Dae Jung Kim, Seoul (KR); Dong Woo Paeng, Anyang-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 200 days.

(21) Appl. No.: 13/277,560

(22) Filed: Oct. 20, 2011

(65) Prior Publication Data

US 2012/0120141 A1 May 17, 2012

(30) Foreign Application Priority Data

Nov. 12, 2010 (KR) .................. 10-2010-0112377

(51) Int. Cl.
*B41J 2/205* (2006.01)

(52) U.S. Cl.
USPC .................................. 347/15; 347/98; 347/37

(58) Field of Classification Search
USPC ........... 347/12, 13, 20, 37, 40, 42, 43, 98, 96, 347/100, 15
See application file for complete search history.

*Primary Examiner* — Julian Huffman
*Assistant Examiner* — Sharon A Polk
(74) *Attorney, Agent, or Firm* — Harness, Dickey & Pierce, P.L.C.

(57) ABSTRACT

In an embodiment of the apparatus, a transparent inkjet head includes a first plurality of nozzles, and a color inkjet head includes a second plurality of nozzles. A color value measurement unit is configured to measure color values of ink applied to a plurality of pixels based on signals applied to the second plurality of nozzles of the color inkjet head and signals applied to the first plurality of nozzles of the transparent inkjet head. A control unit is configured to compare the measured color values of the ink applied to the plurality of pixels with a target value and to change the signals applied to the first plurality of nozzles of the transparent inkjet head such that the measured color values of the ink applied to the plurality of pixels are uniform.

12 Claims, 6 Drawing Sheets

INK DISCHARGE APPARATUS AND METHOD OF CONTROLLING THE SAME

CROSS-REFERENCE TO RELATED APPLICATION

This application claims priority under 35 U.S.C. §119 to Korean Patent Application No. 2010-112377, filed on Nov. 12, 2010 in the Korean Intellectual Property Office (KIPO), the entire contents of which is incorporated herein by reference.

BACKGROUND

1. Field

Example embodiments relate to an ink discharge apparatus to discharge uniform amounts of transparent ink droplets and a method of controlling the same.

2. Description of the Related Art

An ink discharge apparatus discharges a desired amount of ink droplets at a desired position on a printing medium. The ink discharge apparatus includes an inkjet head having a plurality of nozzles to discharge ink droplets.

In order to manufacture a high quality Liquid Crystal Display (LCD) panel in a printing process using an inkjet head, ink needs to be uniformly applied to the LCD panel. The ink may be uniformly applied by uniformly adjusting the amount of ink droplets discharged from the plurality of nozzles of the head. That is, making the amount of ink droplets discharged from the inkjet head uniform is necessary for manufacture of a high quality LCD panel using an inkjet head.

In general, in a panel printed by applying the same signal to the nozzles of the inkjet head, a difference between the amounts of ink droplets discharged from nozzles may be visually recognized as a stain by an inspector. That is, even when the same signal is applied, the same amount of ink droplets may not be discharged due to differences in the characteristics of the nozzles of the inkjet head. Accordingly, the amounts of ink droplets discharged from the respective nozzles are accurately measured and voltages applied to the nozzles are changed based on the measured amounts such that the ink droplets are uniformly discharged. Such a process is generally referred to as Driver per Nozzle (DPN).

In a DPN process of the related art, a method of measuring a difference between color values according to the amount of ink is used to measure the amounts of ink discharged from nozzles. In this method, in the case of color ink, since the thickness of applied ink varies according to the amount of ink discharged and a color value varies according to the thickness of applied ink, the amount of applied ink may be extrapolated from the color value. However, in the case of transparent ink, since a color value is not changed according to the thickness of applied ink, it is difficult to measure a difference between the amounts of discharged inks. If the thickness of the transparent ink is measured using a thin-film thickness measurement device of the related art, it takes considerable time to measure the thickness of the transparent ink and to perform a DPN process.

SUMMARY

According to an example embodiment, an ink discharge apparatus includes a transparent inkjet head and a color inkjet head. The transparent inkjet head includes a first plurality of nozzles configured to discharge transparent ink. The color inkjet head includes a second plurality of nozzles configured to discharge color ink. The color inkjet head is arranged in a direction perpendicular to a direction in which the transparent inkjet head extends. The ink discharge apparatus further includes a color value measurement unit configured to measure color values of ink applied to a plurality of pixels. The color value measurement unit measures the color values of ink based on signals applied to the second plurality of nozzles of the color inkjet head and signals applied to the first plurality of nozzles of the transparent inkjet head. The ink discharge apparatus also includes a control unit configured to compare the measured color values of the ink applied to the plurality of pixels with a target value and configured to change the signals applied to the first plurality of nozzles of the transparent inkjet head such that the measured color values of the ink applied to the plurality of pixels are uniform.

According to an example embodiment, the color ink is applied to the plurality of pixels through the color inkjet head and the transparent ink is applied to the plurality of pixels through the transparent inkjet head while the transparent inkjet is traveling in a direction perpendicular to a direction in which the color ink is applied through the color inkjet head.

According to an example embodiment, the target value is a sum or an average of the color values of a first number of pixels corresponding to a second number of nozzles of the transparent inkjet head.

According to an example embodiment, wherein the control unit is further configured to calculate the signals individually applied to the plurality of nozzles using the target value such that a color value distribution of the plurality of pixels corresponding to the first plurality of nozzles of the transparent inkjet head does not exceed a reference value.

According to an example embodiment, the color value distribution is a difference between a maximum value and a minimum value of the pixel color values.

According to an example embodiment, the control unit is further configured to calculate the signals individually applied to the plurality of nozzles of the transparent inkjet head such that a difference between color values of adjacent pixels does not exceed a maximum value.

According to an example embodiment, the control unit is further configured to compare a sum or an average of the measured color values of the ink applied to the plurality of pixels with the target value and configured to change the signals applied to the first plurality of nozzles of the transparent inkjet head such that the measured color values of the ink applied to the plurality of pixels are uniform.

According to an example embodiment, the color values are calculated based on at least one of a transmittance of light passing through the applied ink, a chromaticity difference of the applied ink, and a spectral value of the applied ink.

According to an example embodiment, a method of controlling an ink discharge apparatus, includes receiving a reference signal and applying color ink via a color inkjet head or transparent ink via a transparent inkjet head to a plurality of pixels through a respective plurality of nozzles of the color inkjet head and the transparent inkjet head, measuring color values of ink applied to the plurality of pixels, comparing the measured color values of the ink applied to the plurality of pixels with a target value, and changing signals applied to the plurality of nozzles of the transparent inkjet head such that the measured color values of the ink applied to the plurality of pixels are uniform.

According to an example embodiment, the method further includes reducing color value measurement errors of the plurality of pixels.

According to an example embodiment, the target value is a sum or an average of the color values of a first number of pixels corresponding to a second number of nozzles of the transparent inkjet head in order to reduce the color value measurement errors.

According to an example embodiment, the comparing compares a sum or an average of the measured color values of ink applied to the plurality of pixels with the target value to reduce the color value measurement errors.

According to an example embodiment, the color inkjet head extends in a direction perpendicular to a direction in which the transparent inkjet head extends.

BRIEF DESCRIPTION OF THE DRAWINGS

Example embodiments will be more clearly understood from the following brief description taken in conjunction with the accompanying drawings.

FIG. 1 is a schematic diagram showing the configuration of a conventional ink discharge apparatus;

FIG. 2 is a diagram showing the configuration of a conventional inkjet head;

FIG. 3 is a diagram showing an inkjet head according to an example embodiment;

FIG. 4 is a graph showing a color value changed according to repeated discharge of ink from the same nozzle of a transparent inkjet head according to an example embodiment;

FIG. 5 is a graph showing a color value changed according to repeated measurement of a color value using a color value measurement unit according to an embodiment; and FIG. 6 is a flowchart illustrating a method of controlling an inkjet head according to an example embodiment.

DETAILED DESCRIPTION

Figure 1:
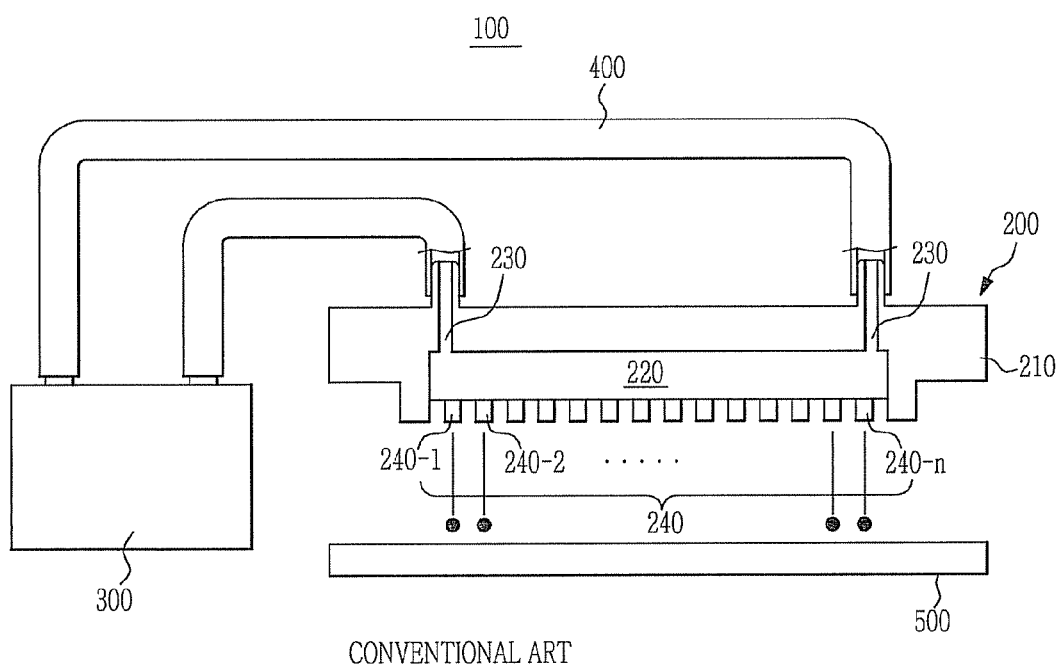
FIGS. 1-6 represent non-limiting, example embodiments as described herein.

Detailed example embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It will be understood that, although the terms first, second, etc. may be used herein to describe various elements, these elements should not be limited by these terms. These taints are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

FIG. 1 is a schematic diagram showing the configuration of a conventional ink discharge apparatus.

In FIG. 1, an ink discharge apparatus 100 includes an inkjet head 200, an ink reservoir 300 to store ink, and an ink supply pipe 400 to supply ink.

The inkjet head 200 includes a body 210 forming an external appearance thereof, a common flow channel 220 formed in the body 210 to receive an ink, an inlet 230 through which ink flows into the common flow channel 220, and a plurality of nozzles 240 (240-1, 240-2, . . . , and 240-n) to discharge the ink contained in the common flow channel 220.

The inlet 230 of the inkjet head 200 is connected to the ink supply pipe 400 so as to supply the ink contained in the reservoir 300 to the common flow channel 220.

The plurality of nozzles 240 (240-1, 240-2, . . . , and 240-n) of the inkjet head 200 are connected to the common flow channel 220 to receive the ink contained in the common flow channel 220 and discharge the ink to a plurality of pixels 500 in a droplet form.

The ink supply pipe 400 is connected to the ink reservoir 300 so as to supply the ink contained in the ink reservoir 300 to the common flow channel 220 through the inlet 230 of the inkjet head 200.

Figure 2:
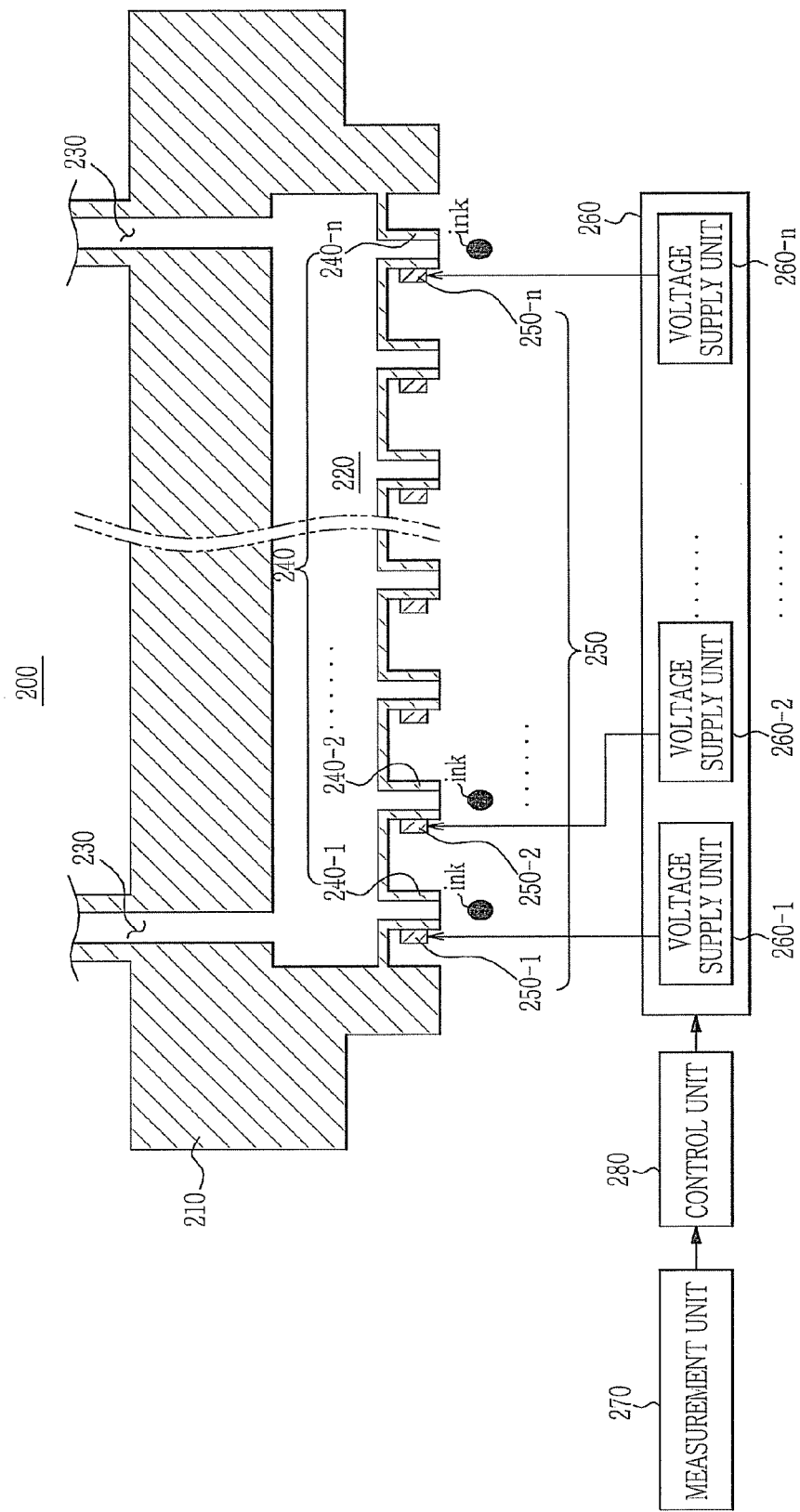

FIG. 2 is a diagram showing the configuration of a conventional inkjet head.

As shown in FIG. 2, the inkjet head 200 further includes a plurality of actuators 250 (250-1, 250-2, and 250-n) to adjust the amount of discharged ink droplets, a plurality of signal supply units 260 (260-1, 260-2, . . . , and 260-n), a measurement unit 270, and a control unit 280.

The plurality of actuators 250 (250-1, 250-2, . . . , and 250-n) are provided in the plurality of nozzles 240 (240-1, 240-2, and 240-n) so as to generate a driving/discharging force to individually discharge the ink from the nozzles 240 (240-1, 240-2, . . . , and 240-n), such that the ink contained in the plurality of nozzles 240 (240-1, 240-2, . . . , and 240-n) is discharged in a droplet form through an ejection mechanism including shrinking/squeezing and relaxing/releasing the plurality of nozzles 240 (240-1, 240-2, . . . , and 240-n). The inkjet head 200 discharges ink droplets to the plurality of pixels 500 through the plurality of nozzles 240 (240-1, 240-2, . . . , 240-n).

The mechanism to shrink/squeeze and release the plurality of nozzles 240 (240-1, 240-2, . . . , and 240-n) to discharge the ink droplets uses a piezoelectric method and/or a thermal method of applying pressure and/or heat to the plurality of nozzles 240 (240-1, 240-2, . . . , and 240-*n*). The plurality of nozzles 240 (240-1, 240-2, . . . , and 240-*n*) are formed of a material which may be shrunk/squeezed and relaxed/released by pressure and/or heat.

The plurality of signal supply units 260 (260-1, 260-2, and 260-*n*) individually supply signals to the plurality of actuators 250 (250-1, 250-2, and 250-*n*) under the control of the control unit 280. The plurality of signal supply units 260 (260-1, 260-2, . . . , and 260-*n*) supply signals to the plurality of nozzles 240 (240-1, 240-2, . . . , and 240-*n*) such that variation in signals applied to the nozzles 240 (240-1, 240-2, . . . , and 240-*n*) is minimized.

The actuators 250 (250-1, 250-2, . . . , and 250-*n*) of the plurality of nozzles 240 (240-1, 240-2, . . . , and 240-*n*) are electrically connected to the plurality of signal supply units 260 (260-1, 260-2, . . . , and 260-*n*) so as to generate different discharging/driving forces according to the signals supplied from the plurality of signal supply units 260 (260-1, 260-2, . . . , and 260-*n*).

The measurement unit 270 measures color values of the pixels when the ink droplets are discharged from the plurality of nozzles 240 (240-1, 240-2, . . . , and 240-*n*) and applied to the plurality of pixels 500 based on the signals supplied to the plurality of nozzles 240 (240-1, 240-2, . . . , and 240-*n*), and measures color values according to the amount of droplets discharged from the plurality of nozzles 240 (240-1, 240-2, . . . , and 240-*n*). If the ink droplets are discharged from the plurality of nozzles 240 (240-1, 240-2, . . . , and 240-*n*) to the plurality of pixels 500, the color values are measured using the measurement unit 270.

In manufacture of the plurality of pixels 500 using the inkjet head, in order to improve the quality of the plurality of pixels 500, formation of visible stains must be avoided. As described above, the amount of ink droplets filled in the plurality of pixels 500 is not uniform. In the case where a set of the amounts of ink discharged from the nozzles is {Q(1), Q(2), . . . , and Q(n)} and a set of absolute values of differences between the amounts of inks discharged from adjacent nozzles is {|Q(2)−Q(1)|, . . . , and |Q(n)−Q(n−1)|}, visible stains are not formed if the following two conditions are satisfied.

Max(Q(1), Q(2), . . . , and Q(n))−Min(Q(1), Q(2), . . . , and Q(n))<A

Max((|Q(2)−Q(1)|, . . . , and |Q(n)−Q(n−1)|)<B

A denotes a reference value of a color value distribution of the plurality of nozzles 240 (240-1, 240-2, . . . , and 240-*n*) and B denotes a reference value of an adjacent color value distribution. The first condition indicates that a distribution of the amounts of inks discharged from the nozzles is within a desired (or, alternatively predetermined) numerical value A indicating that the amounts of ink discharged from the nozzles is uniform. The second condition indicates that a difference between the amounts of ink discharged from adjacent nozzles among the plurality of nozzles is within a desired (or, alternatively predetermined) numerical value B indicating that a difference between the amounts of ink discharged from the nozzles is small.

In order to satisfy the two conditions, different signals V(1), V(2), . . . , and V(k) are applied to k nozzles N(1), N(2), . . . , and N(k). The DPN process according to an example embodiment satisfies the two conditions.

The control unit 280 calculates new signals based on the color values of the pixels measured by the measurement unit 270. The method of calculating the new signals will now be described.

The control unit 280 receives the color values of the pixels when the ink droplets are applied to the pixels based on the signals applied to the nozzles 240 (240-1, 240-2, . . . , and 240-*n*) of the inkjet head 200 from the measurement unit 270, compares the color values with a target color value (hereinafter, referred to as a target value), and calculates signals which satisfy the condition of the color value distribution of the plurality of nozzles 240 (240-1, 240-2, . . . , and 240-*n*) and the condition of the difference between the adjacent color values, based on the compared result.

At this time, the control unit 280 uses the target value to calculate the signals applied to the nozzles 240 (240-1, 240-2, . . . , and 240-*n*) in order to make the amount of discharged ink droplets uniform.

In other words, the control unit 280 performs the DPN process which is divided into a process of satisfying the condition of the color value distribution and a process of satisfying the condition of the difference between the adjacent color values. In order to make the amount of discharged ink droplets uniform, the signals are differently set according to the nozzles 240 (240-1, 240-2, . . . , and 240-*n*) having different characteristics. Accordingly, the signal supply units 260 (260-1, 260-2, . . . , and 260-*n*) individually supply the signals to the actuators 250 (250-1, 250-2, . . . , and 250-*n*) of the plurality of nozzles 240 (240-1, 240-2, . . . , and 240-*n*) under the control of the control unit 280.

Accordingly, the control unit 280 may control the signal supply units 260 (260-1, 260-2, . . . , and 260-*n*) to individually supply signals to the actuators 250 (250-1, 250-2, . . . , and 250-*n*) of the plurality of nozzles 240 (240-1, 240-2, . . . , and 240-*n*) such that the plurality of pixels 500 substantially have a uniform color value.

Figure 3:
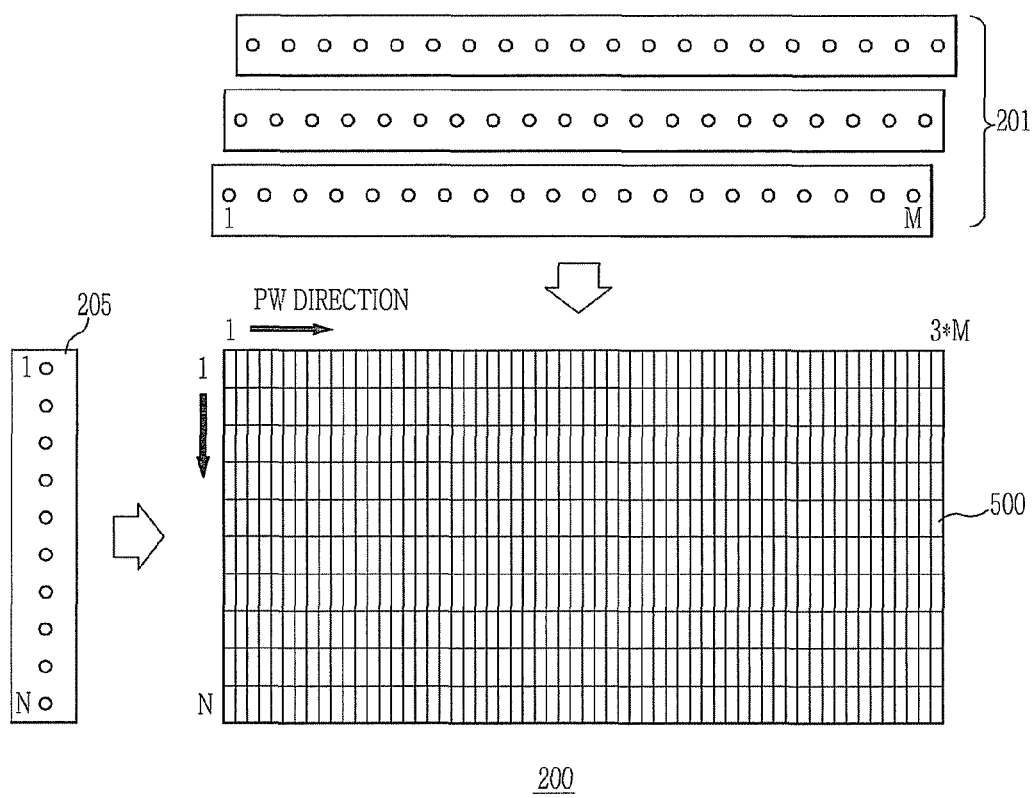

FIG. 3 is a diagram showing an inkjet head according to an example embodiment.

A transparent inkjet head 201 extends in a Print Width (PW) direction of the plurality of pixels 500 and a color inkjet head 205 extends in a Print Horizon (PH) direction of the plurality of pixels 500.

One or more transparent inkjet heads 201 may be included and each of the transparent inkjet heads include a plurality of nozzles to discharge transparent ink. As shown in FIG. 3, in the example embodiment, the number of transparent inkjet heads 201 is three. The transparent inkjet head 201 travels in the PH direction and discharges the transparent ink through the plurality of nozzles. The transparent inkjet head 201 includes a plurality of nozzles. In FIG. 3, each of the three transparent inkjet heads 201 includes M nozzles.

The color inkjet head 205 includes a plurality of nozzles to discharge color ink. The color inkjet head 205 travels in the PW direction and discharges the color ink through the plurality of nozzles. In FIG. 3, the color inkjet head 205 includes N nozzles.

As shown in FIG. 3, the color inkjet head 205 discharges the color ink in a direction perpendicular to a direction in which the transparent inkjet heads 201 discharge the transparent ink. The reason is as follows.

It is assumed that the amount of ink discharged from the nozzles of the color inkjet head 205 (hereinafter, referred to as HC) is $\{Q_{HC}(1), Q_{HC}(2), \ldots, \text{and } Q_{HC}(N)\}$. N denotes the number of nozzles of the HC. If printing is performed while the HC travels in the PW direction and the amount of ink discharged from the nozzles in the PW direction is $\{Q_{HC}(1)(1), Q_{HC}(1)(2), \ldots, \text{and } Q_{HC}(1)(M)\}$, $\{Q_{HC}(2)(1), Q_{HC}(2)(2), \ldots, \text{and } Q_{HC}(2)(M)\}, \ldots,$ and $\{Q_{HC}(N)(1), Q_{HC}(N)(2), \ldots, \text{and } Q_{HC}(N)(M)\}$, $Q_{HC}(k)(1) = Q_{HC}(k)(2) = \ldots = Q_{HC}(k)(M)$ is constant (k=1, 2, . . . , N). A sum $$\sum_{k=1}^{N} Q_{HC}(k)(l)$$

(l=1, 2, ..., M) of the amounts of inks in the PH direction discharged from the nozzles arranged in the PW direction is also constant.

It is assumed that the amount of ink discharged from the nozzles of the transparent inkjet head 201 (hereinafter, referred to as Hn) (Hn (n=1, 2, 3) is $\{Q_{Hn}(1), Q_{Hn}(2), \ldots,$ and $Q_{Hn}(M)\}$. M denotes the number of nozzles of Hn. If printing is performed while Hn travels in the PH direction and the amounts of ink discharged from the nozzles in the PH direction are $\{Q_{Hn}(1)(1), Q_{Hn}(1)(2), \ldots,$ and $Q_{Hn}(1)(N)\}$, $\{Q_{Hn}(2)(1), Q_{Hn}(2)(2), \ldots,$ and $Q_{Hn}(2)(N)\}, \ldots,$ and $\{Q_{Hn}(M)(1), Q_{Hn}(M)(2), \ldots,$ and $Q_{Hn}(M)(N)\}$, $Q_{Hn}(1)(1)=Q_{HC}(1)(2)=\ldots=Q_{HC}(1)(N)$ is constant (l=1, 2, ..., M). A sum $$\sum_{k=1}^{N} Q_{Hn}(l)(k)$$

(l=1, 2, ..., M) of the amount of discharged inks in the PH direction is also constant.

The sum of the amount of color ink discharged from the HC in the PH direction and the sum of the amount of transparent ink discharged from the Hn have always constant values with respect to a specific voltage. These values are constant regardless of whether or not the DPN process of the head HC is perforated.

Accordingly, if the color value of the PH direction of a specific nozzle "l" of the Hn is $\{C_{Hn}(1)(1), C_{Hn}(1)(2), \ldots,$ and $C_{Hn}(1)(N)\}$, the comparison between the color values at the nozzle "l" may be performed using a sum $$\sum_{k=1}^{N} C_{Hn}(l)(k)$$

thereof.

If the comparison is performed using the sum, it is possible to reduce DPN errors due to measurement errors of the color values of the plurality of pixels 500 by an average effect.

Figure 4:
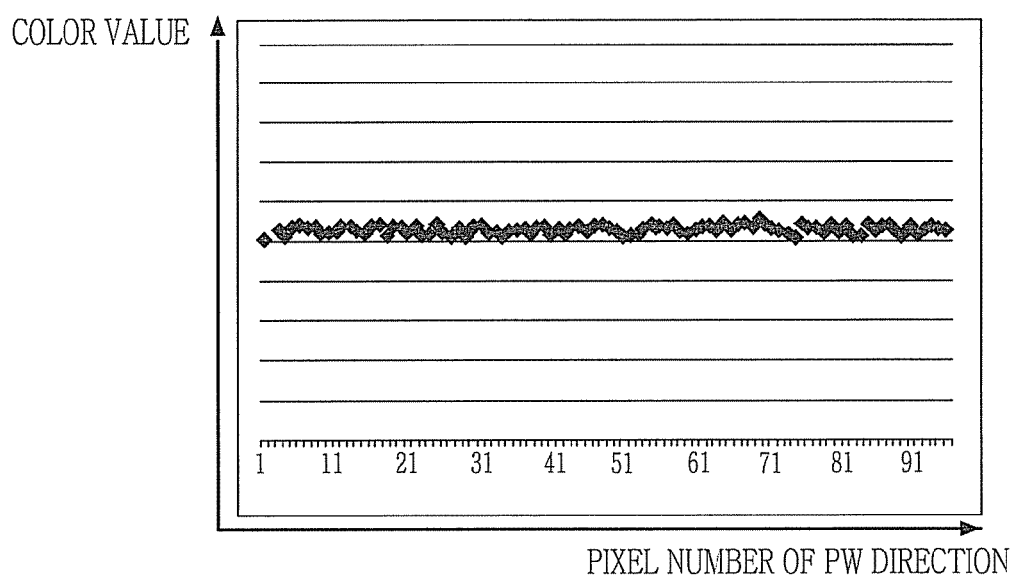

FIG. 4 is a graph showing a change in a color value according to repeated discharge of ink from the same nozzle of a transparent inkjet head according to an example embodiment.

A horizontal axis of the graph denotes a pixel number when printing is perforated while the color inkjet head 205 shown in FIG. 3 travels in the PW direction. A vertical axis of the graph denotes a color value according to the pixel position of a specific nozzle of the color inkjet head 205. FIG. 4 shows that the amount of ink discharged from the same nozzle of the inkjet head 205, which is calculated from the color value measured at the pixel, is within a desired (or, alternatively predetermined) range.

Figure 5:
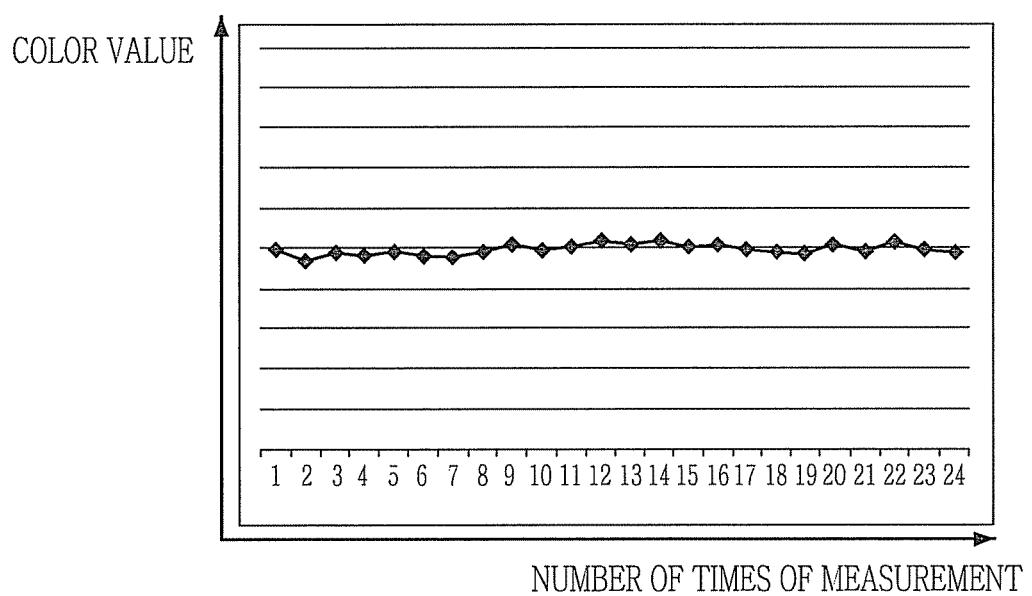

FIG. 5 is a graph showing a change in a color value according to repeated measurement of a color value using a color value measurement unit according to an example embodiment.

A horizontal axis of the graph denotes the number of times of measurement performed by the color value measurement unit 270 and a vertical axis thereof denotes a color value actually measured by the measurement unit 270. FIG. 5 shows that the color values according to the number of times of measurement performed by the color value measurement unit 270 are substantially uniform.

Figure 6:
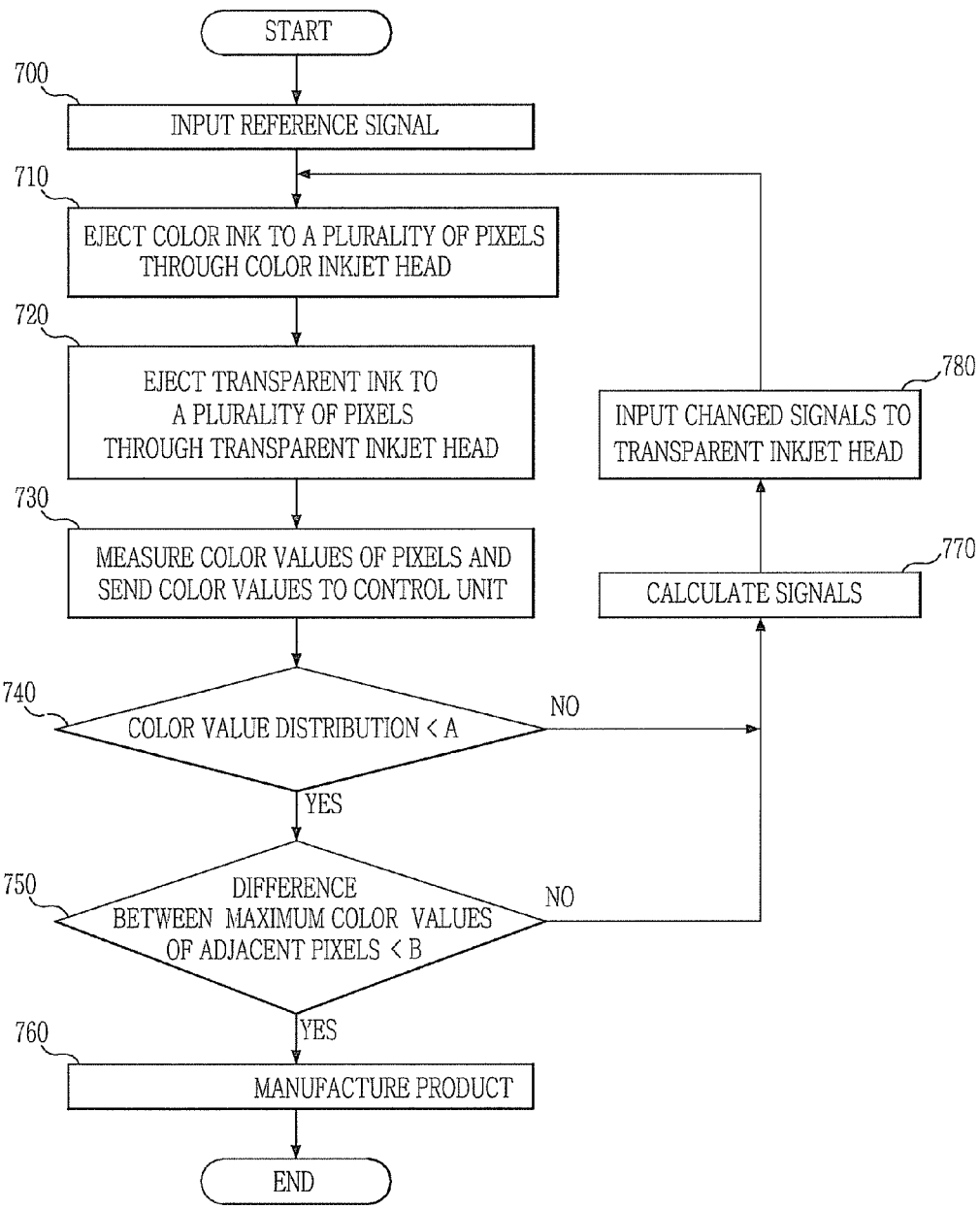

FIG. 6 is a flowchart illustrating a method of controlling an inkjet head according to an example embodiment.

Even when the same signal is applied to the actuators 250 (250-1, 250-2, ..., and 250-n) of the plurality of nozzles 240 (240-1, 240-2, ..., and 240-n) of the inkjet head 200, the nozzles 240 (240-1, 240-2, ..., and 240-n) discharge different amounts of ink droplets according to structural or electrical characteristics thereof. Accordingly, signals applied to the nozzles 240 (240-1, 240-2, ..., and 240-n) to discharge more ink than a target discharge amount and signals applied to the nozzles 240 (240-1, 240-2, ..., and 240-n) to discharge less ink than the target discharge amount are differently set, thereby making the amounts of ink discharged from the nozzles 240 (240-1, 240-2, ..., and 240-n) uniform.

The method of controlling the inkjet head 200 will now be described. The color ink and the transparent ink used to manufacture a product are printed on the plurality of pixels 500. Then, the color ink and the transparent ink are mixed with each other within the plurality of pixels 500. At this time, the amount of color ink is constant, the dilution degree of the color ink is changed according to the amount of transparent ink mixed, and a difference between color values occurs according to the amount of transparent ink. By measuring such difference, it is possible to check the difference between the amounts of discharged transparent ink.

As shown in FIG. 6, first, the voltage supply unit 260 (260-1, 260-2, ..., and 260-n) applies the same signal to the actuators of the nozzles of the color inkjet head 205 and the transparent inkjet head 201 (700). The color inkjet head 205 ejects the color ink to the plurality of pixels according to the applied signal (710). Next, the transparent inkjet head 201 provided in the direction perpendicular to the direction in which the color inkjet head 205 extends ejects the transparent ink to the plurality of pixels (720). The measurement unit 270 measures the color values of the mixed ink applied to the plurality of pixels 500 according to the amount of ink droplets discharged from the nozzles based on the signals applied to the nozzles of the color inkjet head 205 and the transparent inkjet head 201 and sends the color values to the control unit 280 (730).

The control unit 280 determines whether the color value distribution is less than a desired (or, alternatively predetermined) value A based on the measured color values of the mixed ink (740), and proceeds to step S770 of calculating new signal values if the color value distribution is not less than the desired (or, alternatively predetermined) value A.

If it is determined that the color value distribution is less than the desired (or, alternatively predetermined) value A in step 740, the control unit 280 determines that the amounts of ink droplets which are discharged from the nozzles of the transparent inkjet head 201 and filled in the plurality of pixels 500 are uniform (740) and progresses to step 750.

The control unit 280 compares the color values measured by the measurement unit 270 with a desired (or, alternatively predetermined) value B in order to satisfy a maximum color difference between adjacent pixels, and progresses to step 770 of calculating new signal values if the difference between adjacent color values is not less than the desired (or, alternatively predetermined) value B (750).

If it is determined that the maximum color value between adjacent color values is less than the desired (or, alternatively predetermined) value B in step 750, the control unit 280 determines that a difference between the amounts of transparent ink droplets which are discharged from the inkjet head 201 and filled in the plurality of pixels 500 is satisfied and performs a printing operation to manufacture a product (760).

The control unit 280 compares the color values measured by the measurement unit 270 with a target value and calculates new signal values applied to the nozzles of the transparent inkjet head 201 (770). The control unit 280 calculates a variation in signals applied to the nozzles of the transparent inkjet head 201 according to the color values measured by the measurement unit 270 and inputs the varied signals to the transparent inkjet head 201 (780). According to an example embodiment, the maximum color difference between adjacent pixels based on the desired (or, alternatively predetermined) value B may be obtained prior to color distribution based on the desired (or, alternatively predetermined) value A.

According to the ink discharge apparatus and the method of controlling the same since a difference between characteristics of a plurality of nozzles of the inkjet head is recognized and signals applied to the plurality of nozzles are changed in order to make the amounts of transparent ink droplets discharged from the plurality of nozzles having the different characteristics uniform, it is possible to reduce time consumed by a Driver per Nozzle (DPN) process and, in turn, processing time, thereby reducing a preparation time necessary for manufacturing a Liquid Crystal display (LCD) panel and increasing yield.

While example embodiments have been particularly shown and described, it will be understood by one of ordinary skill in the art that variations in form and detail may be made therein without departing from the spirit and scope of the claims.

What is claimed is:

1. An ink discharge apparatus, comprising:
a transparent inkjet head including a first plurality of nozzles configured to discharge transparent ink;
a color inkjet head arranged in a direction perpendicular to a direction in which the transparent inkjet head extends and including a second plurality of nozzles configured to discharge color ink;
a color value measurement unit configured to measure color values of ink applied to a plurality of pixels based on signals applied to the second plurality of nozzles of the color inkjet head and signals applied to the first plurality of nozzles of the transparent inkjet head; and
a control unit configured to compare the measured color values of the ink applied to the plurality of pixels with a target value and configured to change the signals applied to the first plurality of nozzles of the transparent inkjet head such that the measured color values of the ink applied to the plurality of pixels are uniform.

2. The ink discharge apparatus according to claim 1, wherein the color ink is applied to the plurality of pixels through the color inkjet head and the transparent ink is applied to the plurality of pixels through the transparent inkjet head while the transparent inkjet is traveling in a direction perpendicular to a direction in which the color ink is applied through the color inkjet head.

3. The ink discharge apparatus according to claim 1, wherein the target value is a sum or an average of the color values of a first number of pixels corresponding to a second number of nozzles of the transparent inkjet head.

4. The ink discharge apparatus according to claim 1, wherein the control unit is further configured to calculate the signals individually applied to the first and second plurality of nozzles using the target value such that a color value distribution of the plurality of pixels corresponding to the first plurality of nozzles of the transparent inkjet head does not exceed a reference value.

5. The ink discharge apparatus according to claim 4, wherein the color value distribution is a difference between a maximum value and a minimum value of the pixel color values.

6. The ink discharge apparatus according to claim 1, wherein the control unit is further configured to calculate the signals individually applied to the plurality of nozzles of the transparent inkjet head such that a difference between color values of adjacent pixels does not exceed a maximum value.

7. The ink discharge apparatus according to claim 1, wherein the control unit is further configured to compare a sum or an average of the measured color values of the ink applied to the plurality of pixels with the target value and configured to change the signals applied to the first plurality of nozzles of the transparent inkjet head such that the measured color values of the ink applied to the plurality of pixels are uniform.

8. The ink discharge apparatus according to claim 1, wherein the color values are calculated based on at least one of a transmittance of light passing through the applied ink, a chromaticity difference of the applied ink, and a spectral value of the applied ink.

9. A method of controlling an ink discharge apparatus, the method comprising:
receiving a reference signal and applying color ink via a color inkjet head or transparent ink via a transparent inkjet head to a plurality of pixels through a respective plurality of nozzles of the color inkjet head and the transparent inkjet head;
measuring color values of ink applied to the plurality of pixels;
comparing the measured color values of the ink applied to the plurality of pixels with a target value; and
changing signals applied to the first plurality of nozzles of the transparent inkjet head such that the measured color values of the ink applied to the plurality of pixels are uniform;
wherein the color inkjet head extends in a direction perpendicular to a direction in which the transparent inkjet head extends.

10. The method according to claim 9, further comprising:
reducing color value measurement errors of the plurality of pixels.

11. The method according to claim 10, wherein the target value is a sum or an average of the color values of a first number of pixels corresponding to a second number of nozzles of the transparent inkjet head in order to reduce the color value measurement errors.

12. The method according to claim 10, wherein the comparing compares a sum or an average of the measured color values of ink applied to the plurality of pixels with the target value to reduce the color value measurement errors.

* * * * *